United States Patent
Hanks et al.

(10) Patent No.: US 8,674,160 B2
(45) Date of Patent: Mar. 18, 2014

(54) DEWAXING OF RENEWABLE DIESEL FUEL

(75) Inventors: Patrick L. Hanks, Fairfax, VA (US);
Timothy L. Hilbert, Fairfax, VA (US);
William J. Novak, Bedminster, NJ (US);
Christopher G. Oliveri, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 291 days.

(21) Appl. No.: 13/043,804

(22) Filed: Mar. 9, 2011

(65) Prior Publication Data
US 2011/0219671 A1 Sep. 15, 2011

Related U.S. Application Data

(60) Provisional application No. 61/339,795, filed on Mar. 9, 2010.

(51) Int. Cl.
*C10L 1/02* (2006.01)

(52) U.S. Cl.
USPC ........... 585/733; 585/240; 585/242; 585/357; 585/469; 585/638; 44/605; 44/606; 208/49; 208/212

(58) Field of Classification Search
USPC ............... 44/605–606; 208/49, 212; 585/240, 585/242, 357, 469, 638, 733
See application file for complete search history.

(56) References Cited

U.S. PATENT DOCUMENTS

| | | | |
|---|---|---|---|
| 5,246,566 | A | 9/1993 | Miller |
| 7,511,181 | B2 | 3/2009 | Petri et al. |
| 2004/0230085 | A1 | 11/2004 | Jakkula et al. |
| 2007/0135666 | A1 | 6/2007 | Koivusalmi et al. |
| 2007/0135669 | A1 | 6/2007 | Koivusalmi et al. |
| 2007/0287871 | A1 | 12/2007 | Brevoord et al. |
| 2008/0066374 | A1 | 3/2008 | Herskowitz |
| 2008/0132435 | A1 | 6/2008 | Ferreira Fontes et al. |
| 2009/0019763 | A1 | 1/2009 | Ghonasgi et al. |
| 2009/0031617 | A1 | 2/2009 | O'Rear |
| 2009/0287029 | A1 | 11/2009 | Anumakonda et al. |
| 2009/0326290 | A1 | 12/2009 | Bouchy et al. |
| 2010/0084313 | A1* | 4/2010 | Helton et al. ............... 208/60 |
| 2010/0176026 | A1* | 7/2010 | Cole et al. ................. 208/49 |
| 2010/0176027 | A1* | 7/2010 | Oliveri et al. ............. 208/49 |

FOREIGN PATENT DOCUMENTS

| | | |
|---|---|---|
| WO | 2007068800 | 6/2007 |
| WO | 2008101945 | 8/2008 |
| WO | 2008113492 | 9/2008 |
| WO | 2009156452 | 12/2009 |

OTHER PUBLICATIONS

Satterfield, C.N. (1980). Heterogenous Catalysis in Practice, McGraw-Hill, 416 pgs. (Office action cites p. 250).*

* cited by examiner

*Primary Examiner* — Brian McCaig
(74) *Attorney, Agent, or Firm* — Bruce M. Bordelon; Chad A. Guice

(57) ABSTRACT

Feeds containing a hydrotreated biocomponent portion, and optionally a mineral portion, can be processed under catalytic conditions for isomerization and/or dewaxing. The sulfur content of the feed for dewaxing can be selected based on the hydrogenation metal used for the catalyst. Diesel fuel products with improved cold flow properties can be produced.

20 Claims, 2 Drawing Sheets

DEWAXING OF RENEWABLE DIESEL FUEL

CROSS-REFERENCE TO RELATED APPLICATIONS

This Application claims the benefit of U.S. Provisional Application No. 61/339,795, filed Mar. 9, 2010, which is hereby incorporated by reference herein in its entirety.

FIELD OF THE INVENTION

This invention relates to hydroprocessing of fuel feedstocks derived from biocomponent sources, as well as hydroprocessing of blends of biocomponent and mineral fuel feedstocks.

BACKGROUND OF THE INVENTION

Biodiesel is gaining growing acceptance as a diesel fuel component. "Biodiesel" typically comprises fatty acid esters made from vegetable oil triglycerides, which can include various crops or waste oil, or other animal fats. Algae sources can also yield suitable triglycerides. The raw vegetable oil or animal fat triglycerides are reacted with alcohols such as methanol to form fatty acid alkyl esters specifically to attain a viscosity within the diesel specification. A common type of fatty acid alkyl ester is fatty acid methyl ester, or FAME. A separate ASTM specification has issued that covers Biodiesel (D6751-07) when blended with conventional diesel, but some of the specifications are not consistent with conventional diesel specifications required for the mixed blend. For example, the biodiesel Cloud Point specification is shown as "report only", with a footnote that it is usually higher than conventional diesel fuel and that this need to be taken into consideration. Biodiesel fuels often have relatively high cloud points. As a result, blends of biodiesel and conventional diesel may render the total blend unsuitable in terms of cloud point and/or other cold flow properties.

European Patent Application Nos. EP 1741767 and EP 1741768 each describe methods for hydroprocessing diesel range feeds based on biocomponent sources, such as vegetable or animal fats/oils. The hydroprocessing methods include exposing the biocomponent feed to hydrotreating conditions, followed by a hydroprocessing step for isomerizing the feed. Isomerization catalysts identified in these publications include SAPO-11, SAPO-41, ZSM-22, ZSM-23, and ferrierite. The isomerization catalysts are described as also including a Group VIII metal such as Pt and a binder such as alumina. The lowest cloud points identified in the references are between −14° C. and −22° C. The levels of n-paraffins remaining in the isomerized diesel products were not specified.

U.S. Published Patent Application No. 2007/0006523 describes methods for producing diesel fuels from a Tall Oil Fatty Acid (TOFA) fraction. The TOFA fraction is described as including triglycerides present in biocomponent feeds, such as rapeseed oil, sunflower oil, or palm oil. The methods include hydrotreatment, followed by isomerization. The most suitable isomerization catalysts are described as catalysts with low acidity. SAPO-11 bound with alumina and ZSM-22 or ZSM-23 bound with alumina are provided as examples of isomerization catalysts. The isomerization catalyst is also described as including a supported Group VIII metal such as Pt. No cloud points are provided for the diesel fuel products. The lowest reported number for the amount of n-paraffins in an isomerized product is 13%.

U.S. Published Patent Application No. 2006/0207166 describes methods for hydroprocessing biocomponent feeds in a single step. The single step performs both hydrodeoxygenation and hydroisomerization. The catalyst for the single step is described as including both a metal component and an acidic component. The metal component is described as platinum or palladium. A wide variety of zeolites are described for the acidic component. A porous solid support may also be present. The lowest cloud points reported for diesel fuels made according to the process described in this publication are between −11° C. and −16° C. A cloud point below −20° C. is also reported in a comparative example. After processing, the reported diesel products had n-paraffin contents of at least 14.5%.

U.S. Published Patent Application No. 2009/0019763 describes a method for treating mixtures of vegetable oil and mineral feed with a catalyst under hydrotreating conditions. The catalyst can include cobalt and molybdenum supported on a dealuminated form of ZSM-5.

International Application No. PCT/US2008/012516 describes methods for treating a biocomponent feedstock by first hydrotreating the feed and then dewaxing the feed under catalytic dewaxing conditions. The dewaxing catalyst can be a ZSM-48 containing catalyst that includes platinum.

What is needed is a method for producing biocomponent based diesel fuels with improved properties to facilitate use in the commercial fuel supply. Preferably, the method would allow for production of diesel fuels that satisfy any current cold flow property requirements while also providing improved cetane.

SUMMARY OF THE INVENTION

One aspect of the invention relates to a method for isomerizing and/or dewaxing a diesel fuel, comprising: mixing a biocomponent feed portion with a mineral feed portion to form a combined feedstock, the combined feedstock having a sulfur content of less than about 500 wppm, the biocomponent feed portion being at least about 25 wt % of the combined feedstock; and contacting the combined feedstock with an isomerization/dewaxing catalyst under effective isomerization and/or dewaxing conditions including a temperature of at least about 350° C., the isomerization/dewaxing catalyst comprising ZSM-48 and at least 0.5 wt % of Pt, Pd, or a combination thereof, the ZSM-48 having a silica to alumina ratio of about 75:1 or less, the isomerization and/or dewaxing conditions being sufficient to produce an isomerized and/or dewaxed product having a cloud point of about −20° C. or less, wherein the biocomponent feed portion is hydrotreated prior to contacting the combined feedstock with the isomerization/dewaxing catalyst.

Another aspect of the invention relates to a method for isomerizing and/or dewaxing a diesel fuel, comprising: hydrotreating a feedstock, including a biocomponent portion of at least about 25 wt % of the feedstock, under effective hydrotreating conditions, the biocomponent portion having an oxygen content of at least about 8 wt % prior to hydrotreatment; and contacting the hydrotreated feedstock with an isomerization/dewaxing catalyst under effective isomerization and/or dewaxing conditions including a temperature of at least about 370° C., the isomerization/dewaxing catalyst comprising a molecular sieve selected from Beta, USY, ZSM-5, ZSM-35, ZSM-23, ZSM-48, or a combination thereof, and including at least about 2 wt % of a hydrogenation metal being a combination of Ni and at least one of W and Mo, the isomerization/dewaxing conditions being effective to produce an isomerized and/or dewaxed product having a cloud point of about −20° C. or less.

DETAILED DESCRIPTION OF THE PREFERRED EMBODIMENTS

Figure 1:
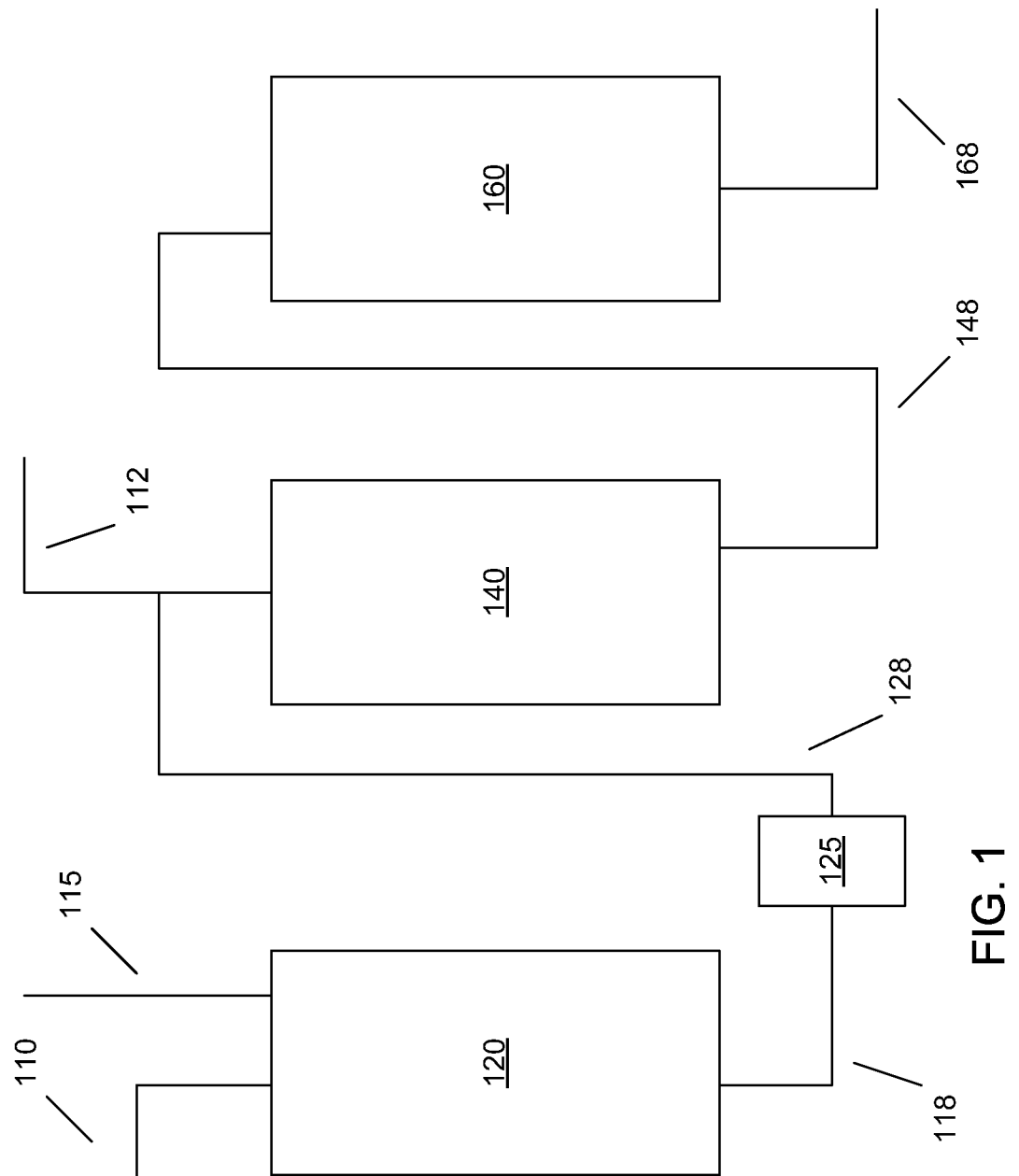
FIG. 1 depicts a reaction system suitable for performing a process according to the invention.

In an embodiment, mixtures of a biocomponent feed and a mineral feed can be treated under hydroprocessing conditions to produce a diesel fuel with beneficial cold flow properties. For example, a mixture of at least 5 wt % of a hydrotreated biocomponent feed portion can be combined with a mineral feed portion to form a diesel boiling range feedstock. The combined diesel range feedstock can be exposed to an isomerization/dewaxing catalyst that includes a Group VIII metal, such as Pt or Ni, and optionally (e.g., usually when the Group VIII metal is Ni or the like) a Group VIB metal, such as Mo and/or W. Preferably, the base of the isomerization/dewaxing catalyst can include a molecular sieve, such as a zeolite with a suitable ratio of silicon to aluminum (e.g., expressed in the common oxide forms, namely silica to alumina, abbreviated as $Si/Al_2$) in the zeolite. The combined diesel range feedstock can be exposed to the isomerization/dewaxing catalyst under effective catalytic isomerization and/or dewaxing conditions. This can result in a diesel boiling range product with improved cold flow properties, particularly at least improved (or higher) cloud point, and that is suitable for use as a diesel fuel. Additionally or alternately, either the combined feedstock or one or both of the individual feedstock portions can optionally be hydrotreated prior to isomerization/dewaxing. Also additionally or alternately, the feedstock can optionally be hydrofinished after isomerization/dewaxing.

One potential use for the methods according to the invention is to make use of "winter diesel" processing capacity during warmer months. Typical diesel fuels may not be suitable for climates where winter months have extreme cold temperatures, such as −20° C. or lower. To avoid difficulties with cold temperature flow, diesel fuel with improved low temperature properties can be manufactured. One method for making such "winter diesel" is to use an isomerization process, such as catalytic dewaxing, to isomerize a diesel fuel.

The isomerization unit used for making winter diesel could be used during warmer months for additional production of biodiesel, thus increasing refinery utilization. Isomerization can be beneficial for diesel fuels based on biocomponent sources. While diesel fuels based on a biocomponent feed may tend to have higher cetane rating than a mineral diesel feed, the cloud point temperature and other cold flow properties of a biocomponent based diesel fraction are typically not as favorable. Isomerization of a biocomponent diesel fraction can allow the increased cetane value of the biocomponent fraction to be added to the diesel fuel pool, while mitigating any loss in cold flow properties, particularly in cloud point.

Feedstocks

In the discussion below, a "mineral oil" feedstock is meant to be a hydrocarbon-based oil from a fossil/mineral fuel source, such as crude oil, and not the commercial organic product, such as sold under CAS number 8020-83-5, e.g., by Aldrich.

In the discussion below, a biocomponent feedstock refers to a hydrocarbon feedstock derived from a biological raw material component, from biocomponent sources such as vegetable, animal, fish, and/or algae. Note that, for the purposes of this document, vegetable fats/oils refer generally to any plant based material, and can include fat/oils derived from a source such as plants of the genus *Jatropha*. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui,* and *Chlamydomonas reinhardtii*.

The biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure substantially identical to the reaction product of glycerol and three fatty acids. Thus, although a triglyceride is described herein as being comprised of fatty acids, it should be understood that the fatty acid component does not necessarily contain a carboxylic acid hydrogen. In one embodiment, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Biocomponent based diesel boiling range feedstreams typically have relatively low nitrogen and sulfur contents. For example, a biocomponent based feedstream can contain up to about 500 wppm nitrogen, for example up to about 300 wppm nitrogen or up to about 100 wppm nitrogen. Instead of nitrogen and/or sulfur, the primary heteroatom component in biocomponent feeds is oxygen. Biocomponent diesel boiling range feedstreams, e.g., can include up to about 10 wt % oxygen, up to about 12 wt % oxygen, or up to about 14 wt % oxygen. Suitable biocomponent diesel boiling range feedstreams, prior to hydrotreatment, can include at least about 5 wt % oxygen, for example at least about 8 wt % oxygen. A biocomponent feedstream, prior to hydrotreatment, can include an olefin content of at least about 3 wt %, for example at least about 5 wt % or at least about 10 wt %.

In an embodiment, the feedstock can include up to about 100% of a feed having a biocomponent origin. This can be a hydrotreated vegetable oil feed, a hydrotreated fatty acid alkyl ester feed, or another type of hydrotreated biocomponent feed. A hydrotreated biocomponent feed is a feed that has been previously hydroprocessed to at least partially (preferably significantly, meaning by at least 50%, and more preferably substantially, meaning as close to completely as is reasonable under the circumstances, such as by at least 90%, preferably by at least 95%, for example by at least 98%, by at least 99%, by at least 99.9%, by at least 99.97%, by at least 99.98%, or by at least 99.99%) deoxygenate the feed. In another embodiment, a non-hydrotreated biocomponent feed can be hydrotreated to substantially deoxygenate the feed prior to other hydroprocessing. The portion of the feed having a biocomponent origin can be at least about 5 wt %, for example at least about 25 wt %, at least about 50 wt %, or at least about 75 wt %.

A mineral hydrocarbon feedstock refers to a hydrocarbon feedstock derived from crude oil that has optionally but preferably been subjected to one or more separation and/or other refining processes. Preferably, the mineral hydrocarbon feedstock is or includes a petroleum feedstock boiling in the diesel range or above. Examples of suitable feedstocks can include, but are not limited to, virgin distillates, kerosene, diesel boiling range feeds, jet fuel, light cycle oils, and the like, and combinations thereof, including hydrotreated versions thereof.

Mineral feedstreams for blending with a biocomponent feedstream can have a nitrogen content from about 50 wppm to about 2000 wppm, preferably from about 50 wppm to about 1500 wppm, for example from about 75 wppm to about 1000 wppm. Additionally or alternately, feedstreams suitable for use herein can have a sulfur content from about 100 wppm to about 10000 wppm, for example from about 200 wppm to about 5000 wppm or from about 350 wppm to about 2500 wppm. Further additionally or alternately, the combined biocomponent and mineral feedstock can have a sulfur content of at least about 5 wppm, for example at least about 10 wppm, at least about 25 wppm, at least about 100 wppm, at least about 300 wppm, at least about 500 wppm, or at least about 1000 wppm. Independently and/or in this further embodiment, the combined feedstock can have a sulfur content of about 2000 wppm or less, for example about 1000 wppm or less, about 500 wppm or less, about 300 wppm or less, about 100 wppm or less, or about 50 wppm or less. Still further additionally or alternately, the nitrogen content of the combined feedstock can be about 1000 wppm or less, for example about 500 wppm or less, about 300 wppm or less, about 100 wppm or less, about 50 wppm or less, about 30 wppm or less, or about 10 wppm or less.

In some embodiments, an isomerization/dewaxing catalyst can be used that includes the sulfide form of a metal, such as an isomerization/dewaxing catalyst that includes nickel and tungsten. In such embodiments, it can be beneficial for the combined mineral and biocomponent feed to have at least a minimum sulfur content. The minimum sulfur content can be sufficient to maintain the sulfided metals of the isomerization/dewaxing catalyst in a sulfided state. For example, the combined mineral and biocomponent feedstock can have a sulfur content of at least about 50 wppm, for example at least about 100 wppm, at least about 150 wppm, or at least about 200 wppm. Additionally or alternately, the combined mineral and biocomponent feedstock can have a sulfur content of about 500 wppm or less, for example about 400 wppm or less or about 300 wppm or less. In any of these embodiments, the additional sulfur to maintain the metals of the isomerization/dewaxing catalyst in a sulfided state can be provided by gas- and/or liquid-phase sulfur, such as gas-phase $H_2S$. One potential source of $H_2S$ gas can be from hydrotreatment of the mineral portion of a feedstock. If a mineral feed portion is hydrotreated prior to combination with a biocomponent feed, at least a portion of the gas phase effluent from the hydrotreatment process/stage, particularly containing sufficient $H_2S$ gas, can be cascaded along with hydrotreated liquid effluent.

In embodiments where the isomerization/dewaxing stage contains a catalyst that does not include a sulfided form (e.g., including a metal or metallic state or an oxide state), additional benefits can be achieved by selecting a feed with relatively low sulfur content and relatively low nitrogen content. In such embodiments, the sulfur content of the feed to the dewaxing stage can advantageously be less than 10 wppm, preferably less than 5 wppm, for example less than 3 wppm. Additionally or alternatively, in such embodiments, the nitrogen content of the feed to the isomerization/dewaxing stage can advantageously be less than 10 wppm, preferably less than 5 wppm, for example less than 3 wppm.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

Diesel boiling range feedstreams suitable for use in the present invention tend to boil within the range of about 215° F. (about 102° C.) to about 800° F. (about 427° C.). Preferably, the diesel boiling range feedstream has an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Preferably, the diesel boiling range feedstream has a final boiling point of about 800° F. (about 427° C.) or less, or about 775° F. (about 413° C.) or less, or about 750° F. (about 399° C.) or less. In an embodiment, the diesel boiling range feedstream has a boiling range from about 451° F. (about 233° C.) to about 800° C. (about 427° C.). Additionally or alternately, the feedstock can be characterized by the boiling point required to boil a specified percentage of the feed. For example, the temperature required to boil at least 5 wt % of a feed is referred to as a "T5" boiling point. In one embodiment, the mineral oil feedstock can have a T5 boiling point of at least about 230° F. (about 110° C.), for example at least about 250° F. (about 121° C.) or at least about 275° F. (about 135° C.). Further additionally or alternately, the mineral hydrocarbon feed can have a T95 boiling point of about 775° F. (about 418° C.) or less, for example about 750° F. (about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

Hydroprocessing—Isomerization/Dewaxing

Catalytic dewaxing relates to the removal and/or isomerization of long chain, paraffinic molecules from feeds. Catalytic dewaxing can be accomplished by selective hydrocracking or by hydroisomerizing these long chain molecules. Hydroisomerization/hydrodewaxing catalysts can include molecular sieves such as crystalline aluminosilicates (zeolites) and/or silicoaluminophosphates (SAPOs). In an embodiment, the molecular sieve can be a 1-D or 3-D molecular sieve. In another embodiment, the molecular sieve can be a 10-member ring 1-D molecular sieve (e.g., ZSM-48). Examples of molecular sieves can include, but are not limited to, ZSM-48, ZSM-23, ZSM-35, Beta, USY, ZSM-5, and combinations thereof. In an embodiment, the molecular sieve can include or be ZSM-48, ZSM-23, or a combination thereof. The isomerization/dewaxing catalyst can optionally include a binder, such as alumina, titania, silica, silica-alumina, zirconia, or a combination thereof. In an embodiment, the binder can include or be alumina, titania, or a combination thereof. In another embodiment, the binder can include or be titania, silica, zirconia, or a combination thereof.

One feature of molecular sieves that can impact the activity of the molecular sieve is the ratio of silicon to aluminum in the molecular sieve (expressed generally in the oxide form as silica to alumina). For instance, the molecular sieve can advantageously have a silica to alumina ratio of about 200 to 1 or less, preferably about 120 to 1 or less, for example about 100 to 1 or less, about 90 to 1 or less, or about 75 to 1 or less. Additionally or alternately, the molecular sieve can advantageously have a silica to alumina ratio of at least about 30 to 1, for example at least about 50 to 1 or at least about 65 to 1.

The isomerization/dewaxing catalyst can also include a metal hydrogenation component, such as a Group VIII metal. Suitable Group VIII metals can include, but are not limited to, Pt, Pd, Ni, and combinations thereof. The isomerization/dewaxing catalyst can advantageously include at least about 0.1 wt % of the Group VIII metal, for example at least about 0.3 wt %, at least about 0.5 wt %, at least about 1.0 wt %, at least about 2.0 wt %, at least about 2.5 wt %, at least about 3.0 wt %, or at least about 5.0 wt %. Additionally or alternately, the isomerization/dewaxing catalyst can include about 10.0 wt % or less of a Group VIII metal, for example about 7.0 wt % or less, about 5.0 wt % or less, about 3.0 wt % or less, about 2.5 wt % or less, about 2.0 wt % or less, or about 1.5 wt % or less.

In some embodiments, particularly when Group VIII metal is a non-noble metal such as Ni, the isomerization/dewaxing catalyst may additionally include a Group VIB metal, such as W and/or Mo. For instance, in one embodiment, the isomerization/dewaxing catalyst can include Ni and W, Ni and Mo, or a combination of Ni, Mo, and W. In certain such embodiments, the isomerization/dewaxing catalyst can include at least about 0.5 wt % of the Group VIB metal, for example at least about 1.0 wt %, at least about 2.0 wt %, at least about 2.5 wt %, at least about 3.0 wt %, at least about 4.0 wt %, or at least about 5.0 wt %. Additionally or alternately, the isomerization/dewaxing catalyst can include about 20.0 wt % or less of a Group VIB metal, for example about 15.0 wt % or less, about 12.0 wt % or less, about 10.0 wt % or less, about 8.0 wt % or less, about 5.0 wt % or less, about 3.0 wt % or less, or about 1.0 wt % or less. In one particular embodiment, the isomerization/dewaxing catalyst can include only a Group VIII metal selected from Pt, Pd, and a combination thereof.

Catalytic dewaxing can be performed by exposing a feedstock to a dewaxing catalyst (that may, and usually does, also have isomerization activity) under effective (catalytic) dewaxing (and/or isomerization) conditions. Effective dewaxing (and/or isomerization) conditions can include, but are not limited to, a temperature of at least about 500° F. (about 260° C.), for example at least about 550° F. (about 288° C.), at least about 600° F. (about 316° C.), or at least about 650° F. (about 343° C.). Additionally or alternately, the temperature can be about 750° F. (about 399° C.) or less, for example about 700° F. (about 371° C.) or less, or about 650° F. (about 343° C.) or less. Effective dewaxing (and/or isomerization) conditions can additionally or alternately include, but are not limited to, a total pressure of at least about 400 psig (about 2.8 MPag), for example at least about 500 psig (about 3.4 MPag), at least about 750 psig (about 5.2 MPag), or at least about 1000 psig (about 6.9 MPag). Additionally or alternately, the total pressure can be about 1500 psig (about 10.3 MPag) or less, for example about 1200 psig (about 8.2 MPag) or less, about 1000 psig (about 6.9 MPag) or less, or about 800 psig (about 5.5 MPag) or less. Effective dewaxing (and/or isomerization) conditions can additionally or alternately include, but are not limited to, a liquid hourly space velocity (LHSV) of at least about 0.5 $hr^{-1}$, for example at least about 1.0 $hr^{-1}$, at least about 1.5 $hr^{-1}$, or at least about 2.0 $hr^{-1}$. Additionally or alternately, the LHSV can be about 10 $hr^{-1}$ or less, for example about 5.0 $hr^{-1}$ or less, about 3.0 $hr^{-1}$ or less, or about 2.0 $hr^{-1}$ or less. Effective dewaxing (and/or isomerization) conditions can additionally or alternately include, but are not limited to, a treat gas rate of at least about 500 scf/bbl (about 84 $Nm^3/m^3$), for example at least about 750 scf/bbl (about 130 $Nm^3/m^3$) or at least about 1000 scf/bbl (about 170 $Nm^3/m^3$). Additionally or alternately, the treat gas rate can be about 3000 scf/bbl (about 510 $Nm^3/m^3$) or less, for example about 2000 scf/bbl (about 340 Nm³/m³) or less, about 1500 scf/bbl (about 250 Nm³/m³) or less, or about 1250 scf/bbl (about 210 Nm³/m³) or less.

A catalytic dewaxing process can modify a feedstock in several ways. The catalytic dewaxing process can remove oxygen in the biocomponent portion of the feedstock. Olefins in the feedstock can also be at least partially saturated. The dewaxing process can also improve one or more cold flow properties of the feed, such as pour point and cloud point. Optionally, some sulfur and/or nitrogen removal may also occur. It is noted that prior hydrotreatment of a biocomponent feed can substantially remove the oxygen and can saturate olefins. As a result, an isomerization/dewaxing process performed on a previously hydrotreated feed may result in only limited additional deoxygenation and/or olefin saturation.

Typical mineral distillate feeds suitable for conversion into a diesel fuel product can have initial cloud points ranging from about −20° C. to about 5° C. The initial cloud point of biocomponent feeds can be higher still, including feeds with an initial cloud point of up to about 20° C. In order to form a suitable diesel fuel product, catalytic dewaxing (and/or isomerization) conditions can be selected to reduce the cloud point by at least about 10° C., for example by at least about 20° C., by at least about 30° C., by at least about 40° C., or by at least about 50° C.

Hydroprocessing—Hydrotreating and Hydrofinishing

In some embodiments, additional hydroprocessing can be performed before or after the catalytic dewaxing. Prior to isomerization/dewaxing, a feedstock can sometimes be hydrotreated. A hydrotreatment process can remove heteroatoms, such as oxygen, sulfur, and nitrogen from a feedstock. A hydrotreatment process can also saturate olefins.

A hydrotreatment process can be used with a mineral feed, a biocomponent feed, or a combined feed. In an embodiment, a mineral portion of a feed can be hydrotreated separately from a biocomponent portion of a feed. Alternately, a mineral portion and a biocomponent portion can be mixed together for hydrotreatment. Still another option can be to hydrotreat a portion of a feed in one or more hydrotreatment stages, mix the hydrotreated or partially hydrotreated feed with a second portion, and then hydrotreat the mixed feed. In some embodiments, a biocomponent feed portion can be hydrotreated prior to introduction into a reaction system for isomerization/dewaxing according to the invention. Alternately, a biocomponent feed portion can be exposed to both hydrotreatment and isomerization/dewaxing stages in a single reaction system.

A hydrotreatment catalyst can contain at least one of Group VIB and/or Group VIII metals, optionally on a support such as alumina or silica. Examples can include, but are not limited to, NiMo, CoMo, and NiW supported catalysts. Hydrotreating conditions can be selected to be similar to the isomerization/dewaxing conditions noted above. Alternately, the hydrotreating conditions can include, but are not necessarily limited to, a temperature of about 315° C. to about 425° C., a total pressure of about 300 psig (about 2.1 MPag) to about 3000 psig (about 21 MPag), an LHSV of about 0.2 hr$^{-1}$ to about 10 hr$^{-1}$, and a hydrogen treat gas rate of about 500 scf/bbl (about 84 Nm³/m³) to about 10000 scf/bbl (about 1700 Nm³/m³).

During hydrotreatment, the sulfur and nitrogen contents of a feedstock can advantageously be reduced. In an embodiment, the hydrotreatment stage(s) can preferably reduce the sulfur content to a suitable level, such as less than about 100 wppm, for example less than about 50 wppm, less than about 30 wppm, less than about 25 wppm, less than about 20 wppm, less than about 15 wppm, or less than about 10 wppm. In another embodiment, the hydrotreating stage(s) can reduce the sulfur content of the feed to less than about 5 wppm, for example less than about 3 wppm. With regard to nitrogen, the hydrotreating stage(s) can preferably reduce the nitrogen content of the feed to about 30 wppm or less, about 25 wppm or less, about 20 wppm or less, about 15 wppm or less, about 10 wppm or less, about 5 wppm or less, or about 3 wppm or less. If a hydrotreatment process is performed before catalytic isomerization/dewaxing, some or all of the deoxygenation (and optionally but preferably of the olefin saturation) described above can take place during the hydrotreating process.

Hydrotreatment can also be used to deoxygenate a biocomponent feed or other oxygen containing feed. Deoxygenating a feed can avoid problems with catalyst poisoning or deactivation due to the creation of water or carbon oxides during hydroprocessing. The catalytic isomerization/dewaxing process can be used to substantially deoxygenate a feedstock. This corresponds to removing at least 90%, for example at least 95%, at least 98%, at least 99%, at least 99.5%, at least 99.9%, or completely (measurably) all of the oxygen present in the biocomponent feedstock. Alternately, substantially deoxygenating the feedstock can correspond to reducing the oxygenate level of the total feedstock to 0.1 wt % or less, for example 0.05 wt % or less, 0.03 wt % or less, 0.02 wt % or less, 0.01 wt % or less, 0.005 wt % or less, 0.003 wt % or less, 0.002 wt % or less, or 0.001 wt % or less.

If a hydrotreatment stage is used prior to isomerization/dewaxing, a separation device can be used to separate out impurities prior to passing the hydrotreated feedstock to the isomerization/dewaxing stage. The separation device can be a separator, a stripper, a fractionator, or another device suitable for separating gas phase products from liquid phase products. For instance, a separator stage can be used to remove at least a portion of any $H_2S$ and/or $NH_3$ formed during hydrotreatment, e.g., with the remainder of the $H_2S$ and/or $NH_3$ formed during hydrotreatment being cascaded to the isomerization/dewaxing stage, as desired. Alternately, the entire effluent from the hydrotreatment stage can be cascaded to the isomerization/dewaxing stage, if desired. It should be noted that the $H_2S$, when provided to an isomerization/dewaxing stage using a catalyst comprising both Group VIII and Group VIB hydrogenation metals, is believed to facilitate the maintenance of sulfidation of the hydrogenation metals, e.g., in order to help the catalyst retain its isomerization/dewaxing or other catalytic activity.

After isomerization/dewaxing, the isomerized/dewaxed feedstock can be hydrofinished. A hydrofinishing stage can be similar to a hydrotreating stage. For example, hydrofinishing can be a mild hydrotreating directed to saturating any remaining olefins and/or residual aromatics. A post-isomerization/dewaxing hydrofinishing can be carried out in cascade with the isomerization/dewaxing step. A hydrofinishing stage can operate at temperatures from about 150° C. to about 350° C., for example from about 180° C. to about 250° C. Total pressures in the hydrofinishing stage can be from about 400 psig (about 2.9 MPag) to about 3000 psig (about 20.8 MPag). Liquid hourly space velocities in the hydrofinishing stage can be from about 0.1 hr$^{-1}$ to about 5 hr$^{-1}$, for example from about 0.5 hr$^{-1}$ to about 3 hr$^{-1}$. Hydrogen treat gas rates in the hydrofinishing stage can be from about 250 scf/bbl (about 42 Nm³/m³) to about 10,000 scf/bbl (about 1700 Nm³/m³).

Suitable catalysts for hydrofinishing can include hydrotreating catalysts. Alternately, a hydrofinishing or aromatic saturation catalyst can be used, such as a Group VIII and/or Group VIB metal supported on a bound support from the M41S family, such as bound MCM-41. Suitable binders for a support from the M41S family, such as MCM-41, can include alumina, silica, or any other binder or combination of binders that can provide a relatively high productivity and/or relatively low density catalyst. One example of a suitable aromatic saturation catalyst is an alumina bound mesoporous MCM-41 modified with Pt and/or another metal. Such a catalyst can be modified (impregnated) with a hydrogenation metal such as Pt, Pd, another Group VIII metal, a Group VIB metal, or a mixture of such metals. In an embodiment, the amount of hydrogenation (e.g., Group VIII) metal can be at least 0.1 wt %, based on the total catalyst weight, for example at least 0.5 wt % or at least 0.6 wt %. In such embodiments, the amount of hydrogenation metals can be 1.0 wt % or less, for example 0.9 wt % or less, 0.75 wt % or less, or 0.6 wt % or less. Additionally or alternately, the amount of hydrogenation metals, either individually or in mixtures, can be at least 0.1 wt %, for example at least 0.25 wt %, at least 0.5 wt %, at least 0.6 wt %, at least 0.75 wt %, or at least 1 wt %. Additionally or alternately in these embodiments, the amount of hydrogenation metals, either individually or in mixtures, can be 35 wt % or less, for example 20 wt % or less, 15 wt % or less, 10 wt % or less, or 5 wt % or less.

In an embodiment, the hydrofinishing stage can be performed in the same reactor as the isomerization/dewaxing, e.g., with the same treat gas flow and at a contiguous (roughly the same) temperature. Additionally or alternately in some embodiments, stripping does not occur between the hydrofinishing and catalytic isomerization/dewaxing stages.

Diesel Product Properties

The diesel fuel produced by the above processes can have improved characteristics relative to diesel fuel produced by other isomerization/dewaxing processes. The diesel fuel product can have a cetane value (ASTM D976) of at least about 50, for example at least about 55, at least about 60, or at least about 65. Additionally or alternately, the diesel fuel product can have a cetane index (ASTM D4737) of at least about 50, for example at least about 55, at least about 60, or at least about 65. Additionally or alternately, the diesel fuel product can have an n-paraffin content of less than about 10% by weight, for example less than about 8 wt %, less than about 6.5 wt %, or less than about 5 wt %. Additionally or alternately, the cloud point of the diesel fuel product can be about −30° C. or less, for example about −35° C. or less or about −40° C. or less.

Additional Embodiments

Embodiment 1

A method for isomerizing and/or dewaxing a diesel fuel, comprising: mixing a biocomponent feed portion with a mineral feed portion to form a combined feedstock, the combined feedstock having a sulfur content of less than about 500 wppm, the biocomponent feed portion being at least about 25 wt % of the combined feedstock; and contacting the combined feedstock with an isomerization/dewaxing catalyst under effective isomerization and/or dewaxing conditions including a temperature of at least about 350° C., the isomerization/dewaxing catalyst comprising ZSM-48 and at least 0.5 wt % of Pt, Pd, or a combination thereof, the ZSM-48 having a silica to alumina ratio of about 75:1 or less, the isomerization and/or dewaxing conditions being sufficient to produce an isomerized and/or dewaxed product having a cloud point of about −20° C. or less, wherein the biocomponent feed portion is hydrotreated prior to contacting the combined feedstock with the isomerization/dewaxing catalyst.

Embodiment 2

A method for isomerizing and/or dewaxing a diesel fuel, comprising: hydrotreating a feedstock, including a biocomponent portion of at least about 25 wt % of the feedstock, under effective hydrotreating conditions, the biocomponent portion having an oxygen content of at least about 8 wt % prior to hydrotreatment; and contacting the hydrotreated feedstock with an isomerization/dewaxing catalyst under effective isomerization and/or dewaxing conditions including a temperature of at least about 370° C., the isomerization/dewaxing catalyst comprising a molecular sieve selected from Beta, USY, ZSM-5, ZSM-35, ZSM-23, ZSM-48, or a combination thereof, and including at least about 2 wt % of a hydrogenation metal being a combination of Ni and at least one of W and Mo, the isomerization/dewaxing conditions being effective to produce an isomerized and/or dewaxed product having a cloud point of about −20° C. or less.

Embodiment 3

The method of embodiment 2, wherein the molecular sieve is ZSM-23 or ZSM-48 with a silica to alumina ratio of about 90:1 or less.

Embodiment 4

The method of embodiment 2 or embodiment 3, wherein the dewaxing catalyst comprises at least about 2 wt % of Ni and at least about 10 wt % of W, Mo, or a combination thereof.

Embodiment 5

The method of any of embodiments 2-4, further comprising combining the hydrotreated feedstock with a second feedstock prior to said contacting with the isomerization/dewaxing catalyst, the combined feedstock having a sulfur content from about 100 wppm sulfur to about 500 wppm sulfur.

Embodiment 6

The method of embodiment 1, wherein the mineral feed portion is hydrotreated by contacting with a hydrotreating catalyst including at least one hydrogenation metal under effective hydrotreating conditions prior to mixing with the biocomponent feed portion.

Embodiment 7

The method of embodiment 1 or embodiment 6, wherein the mineral feed portion is mixed with the biocomponent feed portion prior to hydrotreatment of the biocomponent feed portion.

Embodiment 8

The method of any one of embodiments 2-5, wherein the second feedstock comprises a mineral feedstock portion that is hydrotreated under effective hydrotreating conditions prior to mixing with the biocomponent feed.

Embodiment 9

The method of any one of the previous embodiments, wherein the isomerized and/or dewaxed product is hydrofinished under effective hydrofinishing conditions.

Embodiment 10

The method of any one of embodiments 2-9, wherein the effective hydrotreating and/or hydrofinishing conditions include a temperature of about 315° C. to about 425° C., a total pressure of about 300 psig (about 2.1 MPag) to about 3000 psig (about 21 MPag), an LHSV of about 0.2 hr$^{-1}$ to about 10 hr$^{-1}$, and a hydrogen treat gas rate of about 500 scf/bbl (about 84 Nm$^3$/m$^3$) to about 10000 scf/bbl (about 1700 Nm$^3$/m$^3$).

Embodiment 11

The method of any one of embodiments 2-10, wherein hydrotreating the feedstock produces a hydrotreated feedstock and a gas phase effluent containing H$_2$S, and wherein contacting the hydrotreated feedstock with the isomerization/dewaxing catalyst further comprises contacting at least a portion of the gas phase effluent with the isomerization/dewaxing catalyst.

Embodiment 12

The method of any one of the previous embodiments, wherein the biocomponent feed portion includes a fat and/or oil whose source is at least one of vegetable, animal, fish, and algae.

Embodiment 13

The method of any one of the previous embodiments, wherein the effective catalytic isomerization/dewaxing conditions include a total pressure of about 400 psig (about 2.8 MPag) to about 1500 psig (about 10.3 MPag), an LHSV of about 0.5 hr$^{-1}$ to about 5.0 hr$^{-1}$, and a treat gas rate of about 500 scf/bbl (about 84 Nm$^3$/m$^3$) to about 2000 scf/bbl (about 340 Nm$^3$/m$^3$).

Embodiment 14

The method of any of the previous embodiments, wherein the hydrotreated feedstream is cascaded to the isomerization/dewaxing step without intermediate separation.

Embodiment 15

The method of any one of the previous embodiments, wherein (i) the combined feedstock has a sulfur content of about 50 wppm or less and a nitrogen content of about 20 wppm or less, (ii) the hydrotreated feedstock has a sulfur content from about 100 wppm sulfur to about 500 wppm sulfur, or (iii) both (i) and (ii).
Example of a Reaction System A reaction system suitable for carrying out the above processes is shown schematically in FIG. 1. In FIG. 1, a mineral hydrocarbon feedstock 110 can be introduced into a first hydrotreatment reactor 120. A hydrogen treat gas stream 115 can also be introduced into hydrotreatment reactor 120. The mineral hydrocarbon feedstock can be exposed to hydrotreating conditions in first hydrotreatment reactor 120 in the presence of one or more catalyst beds that contain hydrotreating catalyst. Preferably, the hydrotreatment can reduce the sulfur content of the treated feedstock to about 50 wppm or less, for example about 10 wppm or less, about 5 wppm or less, or about 3 wppm or less. Additionally or alternately, the hydrotreatment can preferably reduce the nitrogen content of the treated feedstock to about 10 wppm or less, for example about 5 wppm or less or about 3 wppm or less. The hydrotreated feedstock 118 can optionally flow from hydrotreatment reactor 110 into a separation device 125, where gas phase products can be separated from liquid phase products. The liquid output 128 from separation device 125 can then be combined with biocomponent feedstock 112.

In an alternative embodiment, hydrotreatment reactor 120 and separation device 125 can be omitted. In such an embodiment, the mineral hydrocarbon feedstock 110 can pass directly into conduit 128 for combination with biocomponent feedstock 112. Also in such an embodiment, preferably both the mineral feed 110 and the biocomponent feed 112 can be previously hydrotreated. In another alternative embodiment, biocomponent feedstock 112 can be introduced into hydrotreatment reactor 120. In such an embodiment, (a) the biocomponent feed can be mixed with the mineral feed prior to entering hydrotreatment reactor 120, (b) the feeds can mix upon entering the reactor, or (c) the biocomponent feed can be introduced into the second or later stage of a reactor containing multiple hydrotreatment stages.

In various embodiments, the (hydrotreated) mineral hydrocarbon feedstock 128 can be combined with biocomponent feedstock 112 prior to entering isomerization/dewaxing reactor 140. The combined feedstock can be exposed to catalytic isomerization/dewaxing conditions in the presence of one or more catalyst beds that contain an isomerization/dewaxing catalyst.

The effluent 148 from catalytic dewaxing can optionally be hydrofinished in a hydrofinishing stage 160. Depending on the configuration, either effluent 148 or effluent 168 can be considered as a hydroprocessed product for further use and/or processing.
Hydroprocessing Examples A series of processing runs were performed to determine the catalyst activity and resulting products from treating feedstocks with various isomerization/dewaxing catalysts. Table 1 provides a description of 4 such catalysts.

TABLE 1

|  | Molecular Sieve | Hydrogenation Metal | Hydrogenation Metal amt. (wt %) | approx. Si:Al ratio |
|---|---|---|---|---|
| Catalyst 1 | Beta | Pt | ~0.6 |  |
| Catalyst 2 | ZSM-23 | Pt | ~0.6 |  |
| Catalyst 3 | ZSM-48 | Pt | ~0.6 | Less than about 75:1 |
| Catalyst 4 | ZSM-48 | NiW | Ni~3; W~13.8 | Less than about 75:1 |

The catalysts in Table 1 were used for hydroprocessing of various mixtures of mineral and biocomponent feed. For all of the mixtures of biocomponent and mineral feed, a hydrotreated diesel fuel product was used as the mineral feed. The hydrotreated diesel fuel was mixed with either a non-hydrotreated soybean oil (a feed including triglycerides) or a non-hydrotreated fatty acid methyl ester formed from rapeseed oil.

Table 2 shows a series of reaction conditions that were run consecutively. Each of Catalysts 1-4 were exposed to these conditions in separate runs. For each of the runs below, the reaction pressure was about 600 psig (about 4.1 MPag). The treat gas rate was between about 2100 scf/bbl (about 350 Nm$^3$/m$^3$) and about 2300 scf/bbl (about 390 Nm$^3$/m$^3$) of pure (~100%) hydrogen.

As indicated in Table 2, test conditions 4, 5, 7, 8, and 9 correspond to combined feeds that include both biocomponent and mineral portions. Test conditions 1, 2, 6, and 10 correspond to the hydrotreated diesel fuel (mineral portion only). Test condition 3 corresponds to the hydrotreated vegetable oil (biocomponent portion only).

TABLE 2

| Test condition | Feed | Reaction T (° C.) | LHSV (hr⁻¹) |
|---|---|---|---|
| 1 | 100% mineral oil | 349 | 3.3 |
| 2 | 100% mineral oil | 332 | 3.3 |
| 3 | 100% hydrotreated vegetable oil | 332/349 | 2.6 |
| 4 | 50 wt % RME/50 wt % mineral oil | 349 | 3.0 |
| 5 | 50 wt % RME/50 wt % mineral oil | 349 | 1.9 |
| 6 | 100% mineral oil | 349 | 1.9 |
| 7 | 10 wt % RME/90 wt % mineral oil | 371 | 1.9 |
| 8 | 20 wt % veg oil/80 wt % mineral oil | 371 | 1.9 |
| 9 | 20 wt % veg oil/80 wt % mineral oil | 349 | 1.9 |
| 10 | 100% mineral oil | 349 | 3.3 |

Figure 2:
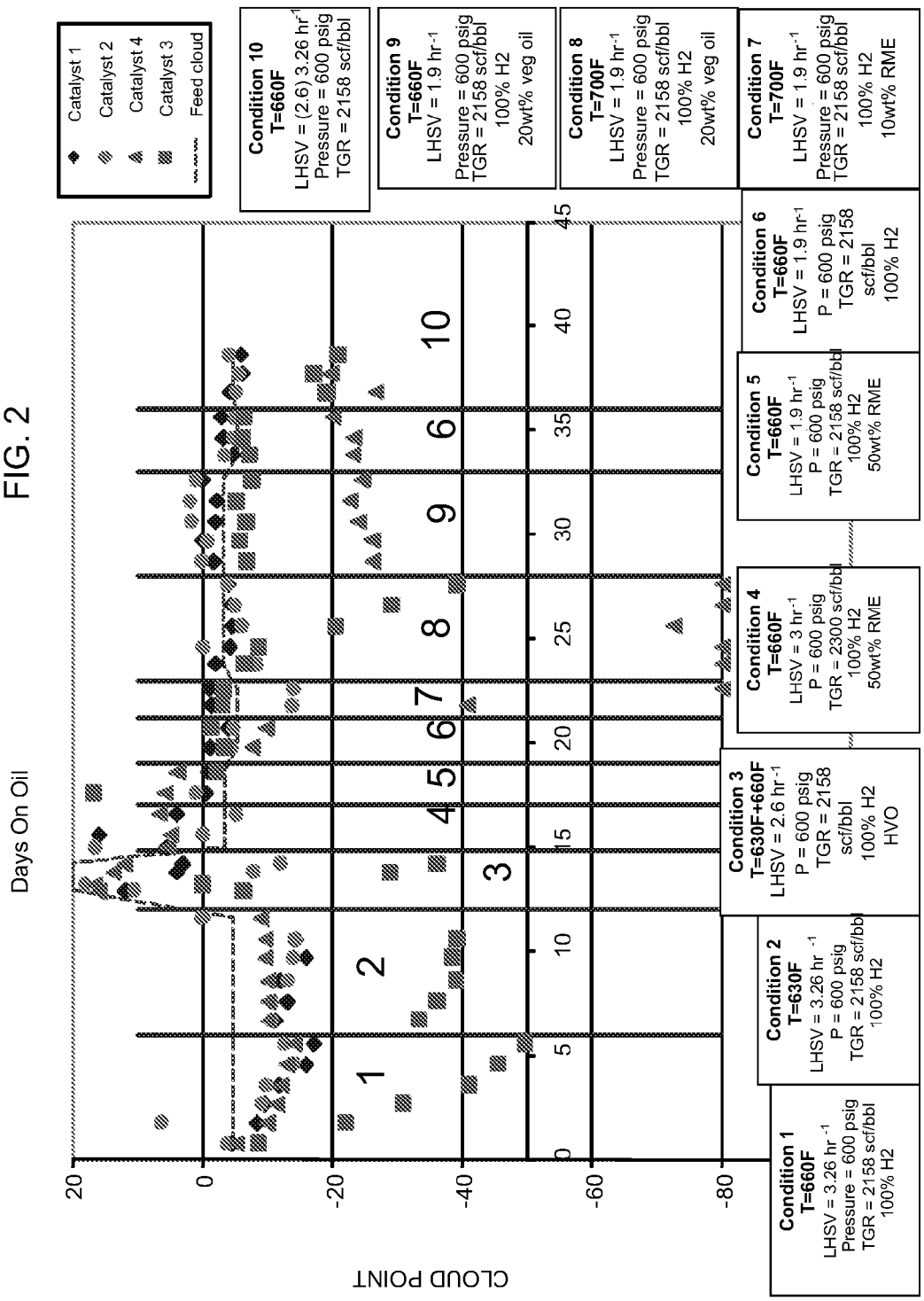
FIG. 2 shows cloud point data for a variety of feeds processed under a variety of test conditions.

Cloud point results for the various processing runs are shown in FIG. 2. FIG. 2 displays cloud point measurements versus number of days on oil for processing runs using Catalysts 1-4. In FIG. 2, numbers are used to indicate the test condition corresponding to each processing area. The dotted line in FIG. 2 shows the cloud point prior to processing for each of the feeds. The various shapes show the results after processing for each catalyst. As indicated in FIG. 2, diamonds correspond to Catalyst 1, circles correspond to Catalyst 2, triangles correspond to Catalyst 3, and squares correspond to Catalyst 4.

Catalysts 1 and 2

FIG. 2 shows that both Catalyst 1 and Catalyst 2 provided some cloud point reduction for deoxygenated biocomponent feeds. Test condition 3 corresponds to a feed containing only hydrotreated vegetable oil. The initial cloud point for this feed was about 20° C. Exposing the feed to Catalyst 1 at a dewaxing temperature of about 349° C. resulted in a product with a cloud point between about 0° C. to about 5° C. A similar process using Catalyst 2 resulted in a product with a cloud point between about −10° C. and −5° C.

Catalyst 3

Catalyst 3 was generally effective for isomerization of mineral feeds, as shown in FIG. 2. In test conditions 1 and 2, Catalyst 3 resulted in cloud point improvements of about 20° C. to 40° C., relative to the feed, with some dependence on the processing temperature. Catalyst 3 performed similarly for the previously hydrotreated vegetable oil of test condition 3. At the higher processing temperature of about 349° C., exposing the hydrotreated vegetable oil to Catalyst 3 resulted in a product having a cloud point between about −25° C. and −35° C. This corresponds to a cloud point reduction of more than about 40° C., or more than about 50° C., relative to the feed cloud point of about 20° C. This is comparable to the cloud point reduction achieved for a mineral feed processed at about 349° C. in test condition 1.

Applicants also note that there is some variation in the data for the various mineral feed only conditions, corresponding to test conditions 1, 2, 6, and 10. In particular, test condition 6 occurs twice. In both instances, test condition 6 shows a lower activity for catalyst 3. Additionally, the activity for cloud point reduction in the second occurrence of test condition 6 is slightly higher than for the first occurrence.

Without being bound by any particular theory as to cause, Applicants note that the presence of biocomponent portions in test conditions 4, 5, 7, 8, and 9 resulted in generation of water. Water can potentially impact catalyst activity in a couple of ways. One impact could be some level of catalyst poisoning due to the presence of the water. It is noted that the first occurrence of test condition 6 was immediately after test conditions using about 50 wt % of biocomponent feed. This test condition showed the least catalyst activity for cloud point reduction. Prior to the second occurrence of test condition 6, a biocomponent feed with only about 20 wt % biocomponent was used. Test condition 6 showed a somewhat greater activity for cloud point reduction. The catalyst appeared to further recover in the test condition 10, which was also a mineral feed. Another impact of the water could be due to catalyst degradation. After the full series of test conditions were completed, this particular catalyst sample was inspected. The bound catalyst particles appeared to have broken down into significantly finer pieces. This may have been due to degradation of the catalyst binder due to the presence of excess water.

Catalyst 4

Under test condition 3, Catalyst 4 had only a modest impact on the cloud point of the hydrotreated vegetable oil. As shown in FIG. 2, processing with Catalyst 4 resulted in a cloud point reduction of only about 5° C. at both temperatures (about 332° C. and about 349° C.). It is noted that Catalyst 4 appeared to have higher activity at temperatures above about 370° C., based on the results from test conditions 8 and 9. Thus, processing at higher temperatures could improve the cloud point reduction activity of Catalyst 4.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for isomerizing and/or dewaxing a diesel fuel, comprising:
    mixing a biocomponent feed portion with a mineral feed portion to form a combined feedstock, the combined feedstock having a sulfur content of less than about 500 wppm, the biocomponent feed portion being at least about 25 wt % of the combined feedstock; and
    contacting the combined feedstock with an isomerization/dewaxing catalyst under effective isomerization and/or dewaxing conditions including a temperature of at least about 350° C., the isomerization/dewaxing catalyst comprising ZSM-48 and at least 0.5 wt % of Pt, Pd, or a combination thereof, the ZSM-48 having a silica to alumina ratio of about 75:1 or less, the isomerization and/or dewaxing conditions being sufficient to produce an isomerized and/or dewaxed product having a cloud point of about −20° C. or less,
    wherein the biocomponent feed portion is hydrotreated prior to contacting the combined feedstock with the isomerization/dewaxing catalyst.

2. The method of claim 1, wherein the biocomponent feed portion includes a fat and/or oil whose source is at least one of vegetable, animal, fish, and algae.

3. The method of claim 1, wherein the effective catalytic isomerization/dewaxing conditions include a total pressure of about 400 psig (about 2.8 MPag) to about 1500 psig (about 10.3 MPag), an LHSV of about 0.5 hr⁻¹ to about 5.0 hr⁻¹, and a treat gas rate of about 500 scf/bbl (about 84 Nm³/m³) to about 2000 scf/bbl (about 340 Nm³/m³).

4. The method of claim 1, wherein the mineral feed portion is hydrotreated by contacting with a hydrotreating catalyst including at least one hydrogenation metal under effective hydrotreating conditions prior to mixing with the biocomponent feed portion.

5. The method of claim 4, wherein the effective hydrotreating conditions include a temperature of about 315° C. to about 425° C., a total pressure of about 300 psig (about 2.1 MPag) to about 3000 psig (about 21 MPag), an LHSV of about 0.2 hr$^{-1}$ to about 10 hr$^{-1}$, and a hydrogen treat gas rate of about 500 scf/bbl (about 84 Nm$^3$/m$^3$) to about 10000 scf/bbl (about 1700 Nm$^3$/m$^3$).

6. The method of claim 4, wherein the hydrotreated feedstream is cascaded to the isomerization/dewaxing step without intermediate separation.

7. The method of claim 1, wherein the combined feedstock has a sulfur content of about 50 wppm or less and a nitrogen content of about 20 wppm or less.

8. The method of claim 1, wherein the mineral feed portion is mixed with the biocomponent feed portion prior to hydrotreatment of the biocomponent feed portion.

9. The method of claim 1, wherein the isomerized and/or dewaxed product is hydrofinished under effective hydrofinishing conditions.

10. A method for isomerizing and/or dewaxing a diesel fuel, comprising:
  hydrotreating a feedstock, including a biocomponent portion of at least about 25 wt % of the feedstock, under effective hydrotreating conditions, the biocomponent portion having an oxygen content of at least about 8 wt % prior to hydrotreatment; and
  contacting the hydrotreated feedstock with an isomerization/dewaxing catalyst under effective isomerization and/or dewaxing conditions including a temperature of at least about 370° C., the isomerization/dewaxing catalyst comprising a molecular sieve selected from Beta, USY, ZSM-5, ZSM-35, ZSM-23, ZSM-48, or a combination thereof, and including at least about 2 wt % of a hydrogenation metal being a combination of Ni and at least one of W and Mo, the isomerization/dewaxing conditions being effective to produce an isomerized and/or dewaxed product having a cloud point of about −20° C. or less.

11. The method of claim 10, wherein the hydrotreated feedstock has a sulfur content from about 100 wppm sulfur to about 500 wppm sulfur.

12. The method of claim 10, wherein hydrotreating the feedstock produces a hydrotreated feedstock and a gas phase effluent containing H$_2$S, and wherein contacting the hydrotreated feedstock with the isomerization/dewaxing catalyst further comprises contacting at least a portion of the gas phase effluent with the isomerization/dewaxing catalyst.

13. The method of claim 10, further comprising combining the hydrotreated feedstock with a second feedstock prior to said contacting with the isomerization/dewaxing catalyst, the combined feedstock having a sulfur content from about 100 wppm sulfur to about 500 wppm sulfur.

14. The method of claim 13, wherein the second feedstock comprises a mineral feedstock portion that is hydrotreated under effective hydrotreating conditions prior to mixing with the biocomponent feed.

15. The method of claim 14, wherein effective hydrotreating conditions include exposing the feed to a catalyst including at least one hydrogenation metal at a temperature of about 315° C. to about 425° C., a total pressure of about 300 psig (about 2.1 MPag) to about 3000 psig (about 21 MPag), an LHSV of about 0.2 hr$^{-1}$ to about 10 hr$^{-1}$, and a hydrogen treat gas rate of about 500 scf/bbl (about 84 Nm$^3$/m$^3$) to about 10000 scf/bbl (about 1700 Nm$^3$/m$^3$).

16. The method of claim 10, wherein the biocomponent portion includes a fat and/or oil whose source is at least one of vegetable, animal, fish, and algae.

17. The method of claim 10, wherein the effective isomerization and/or dewaxing conditions include a total pressure of about 400 psig (about 2.8 MPag) to about 1500 psig (about 10.3 MPag), an LHSV of about 0.5 hr$^{-1}$ to about 5.0 hr$^{-1}$, and a treat gas rate of about 500 scf/bbl (about 84 Nm$^3$/m$^3$) to about 2000 scf/bbl (about 340 Nm$^3$/m$^3$).

18. The method of claim 10, wherein the isomerized and/or dewaxed product is hydrofinished under effective hydrofinishing conditions.

19. The method of claim 10, wherein the molecular sieve is ZSM-23 or ZSM-48 with a silica to alumina ratio of about 90:1 or less.

20. The method of claim 10, wherein the dewaxing catalyst comprises at least about 2 wt % of Ni and at least about 10 wt % of W, Mo, or a combination thereof.

* * * * *